F. J. BEAUMONT.
CONNECTION FOR ELECTRIC BATTERIES.
APPLICATION FILED OCT. 2, 1916.

1,309,561. Patented July 8, 1919.

Witnesses.
M. E. McDade
C. Kesler

Inventor
Frederick J. Beaumont
by
James L. Norris
Attorney

UNITED STATES PATENT OFFICE.

FREDERICK JOHN BEAUMONT, OF LONDON, ENGLAND.

CONNECTION FOR ELECTRIC BATTERIES.

1,309,561.    Specification of Letters Patent.    Patented July 8, 1919.

Application filed October 2, 1916. Serial No. 123,338.

*To all whom it may concern:*

Be it known that I, FREDERICK JOHN BEAUMONT, a subject of the King of Great Britain, residing at London, England, have invented certain new and useful Improvements in Connections for Electric Batteries, of which the following is a specification.

This invention relates to electric batteries and especially to that class composed of several cells connected together to form one battery, and has for its object to form the electric connections between the cells in a simple and effective manner and to obviate the use of solder as is now the case.

My invention will be clearly understood from the following description aided by the annexed drawings which illustrate various examples of carrying my invention into effect and in which Figure 1 is a plan view of a zinc pole and the improved connection formed in one piece and stamped or cut out of sheet metal, the connection being shown in its original form before being bent.

For the purpose of my invention I construct the zinc A or negative pole with, or having attached thereto, an extension piece B or tongue of metal of T shape, the end of which can be passed around and secured to the carbon rod or positive pole of the next cell by rivets or equivalent, and so make an efficient and simple electric connection.

Figure 1:
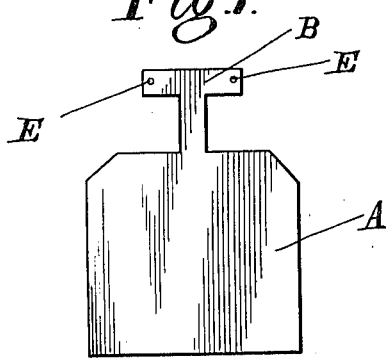
Figure 4:
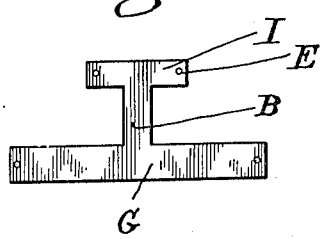
Fig. 4 is a view showing in unbent form, a connection employed with that class of battery where the zinc pole forms the outside casing of the cell.
Figure 3:
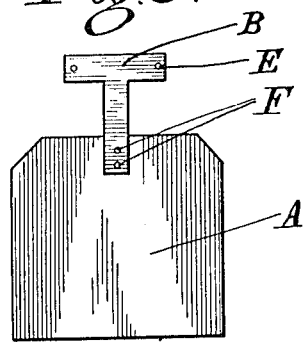
Figure 5:
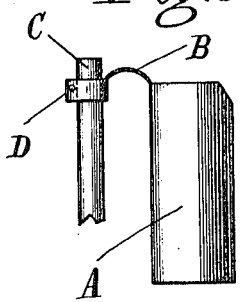
Fig. 5 is a detail view showing the manner of shaping and applying the form of the improved device shown by Fig. 1.
Figure 6:
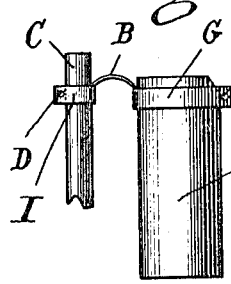
Fig. 6 is a detail view showing the manner of shaping and applying the form of the device illustrated by Fig. 4.

I may carry my invention into effect in several ways, for instance, as shown in Figs. 1 and 5, I may have a sheet of zinc A of suitable size and shape to form the negative pole and form same with an extension piece B or tongue of somewhat T shape, or the sheet of zinc A may be folded to form the casing of the cell and by bending over the tongue piece B, the ends of the T are curled around the carbon rod C of the next cell and secured together by passing a bifurcated rivet D, screwbolt or equivalent through holes E formed in same, when zinc A or other soft metal is employed, the part B of the connection which encircles the carbon rod C may be surrounded with a ring or collar of brass or other hard material to strengthen the same and prevent the zinc or soft metal from stretching or breaking away at the holes E which might then occur. Preferably, however, I position such ring or collar of brass or other hard material on the carbon rod C and then place the portion B of the connection on the outside of the ring or collar. In other cases I may construct the zinc pole A or the casing separate from the connection B as shown in Fig. 3, and secure the T shaped piece B to the zinc or casing by a bifurcated rivet or rivets F or otherwise. Also I may form the connection of somewhat H shape, as shown in Fig. 4, and curl one side G of the same around the zinc cell H and secure the ends together by a rivet D or the like and secure the other side I around the carbon rod C in a similar manner as shown in Fig. 6 and so ensure a positive connection between the positive and negative poles of the cells.

Figure 2:
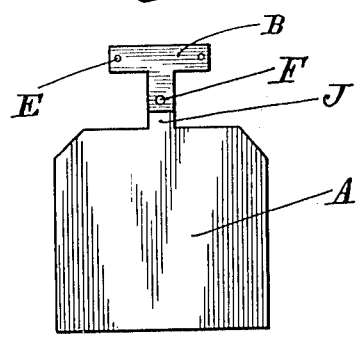
Figs. 2 and 3 are similar views but with the connections formed from separate pieces.
Figure 7:
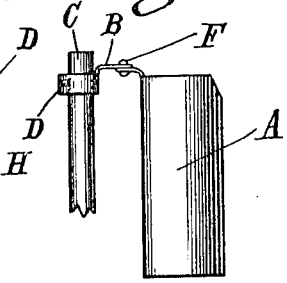
Fig. 7 is a detail view showing the manner of shaping and applying the device shown by Fig. 2.

In the case of the connection being formed separately from the negative pole as in Figs. 2 and 7 I preferably construct the connecting piece B of brass or other suitable hard and non-stretching metal, which is secured to a short extension piece or tongue J formed on the zinc A and secure the same together by a rivet F.

It is understood that I speak of zinc and carbon poles as these are the materials mostly used for this class of battery but of course my invention can be used with other classes of batteries in which other materials are used.

I claim:

1. A device of the class specified for use on electric batteries, comprising a body member and a T-member intersecting and fast to the central portion of one edge of the body member, the latter edge of the body being parallel to the head of the T-member, and the body member and the head of the T-member being bent into circular form with the neck portion of the T-member connecting the upper edge of the said bent head and body member.

2. A connection for the electrodes of electric batteries, comprising a strip of bendable material having a T-shaped bendable member attached thereto and providing oppositely extending projecting tongues which are curled for connection around an electrode, the body of the strip being also bendable and the neck of the T-shaped member being curved upwardly and holding the body of said strip and said T-shaped member in positive spaced relation, and means for securing extremities of the device in applied position.

3. A connection for the electrodes of electric batteries, comprising a member attached at one end to one of the electrodes and having bendable laterally projecting tongues at its opposite ends adapted to be curled around another electrode, and a collar or ring of relatively harder material coöperative with said curled tongues to secure them to their respective electrode.

In testimony whereof I have hereunto set my hand in presence of two subscribing witnesses.

FREDERICK JOHN BEAUMONT.

Witnesses:
H. MAYPELS,
WM. A. BROWN.